United States Patent
Lu et al.

(10) Patent No.: US 10,890,985 B2
(45) Date of Patent: Jan. 12, 2021

(54) MOUSE HAVING MOVABLE LIGHTING STRUCTURE

(71) Applicants: DEXIN ELECTRONIC LTD., Dongguan (CN); DEXIN CORPORATION, New Taipei (TW)

(72) Inventors: Ho-Lung Lu, New Taipei (TW); Chun-Te Yu, Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/509,487

(22) Filed: Jul. 11, 2019

(65) Prior Publication Data

US 2020/0209988 A1 Jul. 2, 2020

(30) Foreign Application Priority Data

Dec. 28, 2018 (TW) .............................. 107147809 A

(51) Int. Cl.
| | |
|---|---|
| *G06F 3/0354* | (2013.01) |
| *G06F 3/038* | (2013.01) |
| *G06K 11/06* | (2006.01) |
| *G06F 3/03* | (2006.01) |

(52) U.S. Cl.
CPC .......... *G06F 3/03543* (2013.01); *G06F 3/038* (2013.01); *G06F 3/0317* (2013.01); *G06K 11/06* (2013.01); *G06F 2203/0337* (2013.01)

(58) Field of Classification Search
CPC .... G06F 3/03543; G06F 3/0317; G06F 3/038; G06F 2203/0337; G06K 11/06
See application file for complete search history.

(56) References Cited

U.S. PATENT DOCUMENTS

| | | | |
|---|---|---|---|
| 2004/0189604 A1* | 9/2004 | Lee ..................... | G06F 3/03543 345/163 |
| 2006/0176277 A1* | 8/2006 | Daniel ................. | G06F 3/0317 345/163 |
| 2010/0007607 A1* | 1/2010 | Li ....................... | G06F 3/03543 345/163 |

* cited by examiner

*Primary Examiner* — Charles V Hicks
(74) *Attorney, Agent, or Firm* — Li & Cai Intellectual Property Office

(57) ABSTRACT

A mouse having a movable lighting structure includes a mouse body, the movable lighting structure, a lighting module and a wire. The mouse body has a longitudinal axis defining a longitudinal axis direction, and has a top surface and a bottom surface opposite to each other. The movable lighting structure is movably disposed on the mouse body, and has an accommodating space formed therein. The lighting module is disposed in the accommodating space, and has at least one light-emitting element. The wire is connected between the mouse body and the lighting module for supplying power required by the lighting module.

8 Claims, 10 Drawing Sheets

MOUSE HAVING MOVABLE LIGHTING STRUCTURE

CROSS-REFERENCE TO RELATED PATENT APPLICATION

This application claims the benefit of priority to Taiwan Patent Application No. 107147809, filed on Dec. 28, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse having a movable lighting structure, and more particularly to a computer mouse having a movable lighting structure.

BACKGROUND OF THE DISCLOSURE

With the prevalence of eSports in recent years, the market for PC gaming peripherals is booming Gaming mice are one of the most iconic products among various types of gaming peripherals. Gaming mice have high sensitivity and high precision. In addition, the design of gaming mice should be ergonomic, stylish and attractive.

In order to enhance the visual appeal of gaming mouse design, a common gaming mouse has a light-emitting element to generate various colors of lights to produce flashy visual effects. However, since the inclusion of a lighting structure will require a change in the layout of circuit components and wires in a mouse, the complexity of the mouse structure may consequently be increased. In addition, it is difficult to provide a lighting structure in a movable structure of a mouse. Therefore, it has become an important issue to improve the structure of conventional mice and overcome the above issues.

SUMMARY OF THE DISCLOSURE

In response to the above-referenced technical inadequacies, the present disclosure provides a mouse having a movable lighting structure.

In one aspect, the present disclosure provides a mouse. The mouse includes a mouse body, a movable lighting structure, a lighting module and a wire. The mouse body has a longitudinal axis defining a longitudinal axis direction of the mouse body, and has a top surface and a bottom surface opposite to each other. The movable lighting structure is movably disposed on the mouse body and has an accommodating space formed therein. The lighting module is disposed in the accommodating space and has at least one light-emitting element. The wire is connected between the mouse body and the lighting module for supplying power required by the lighting module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
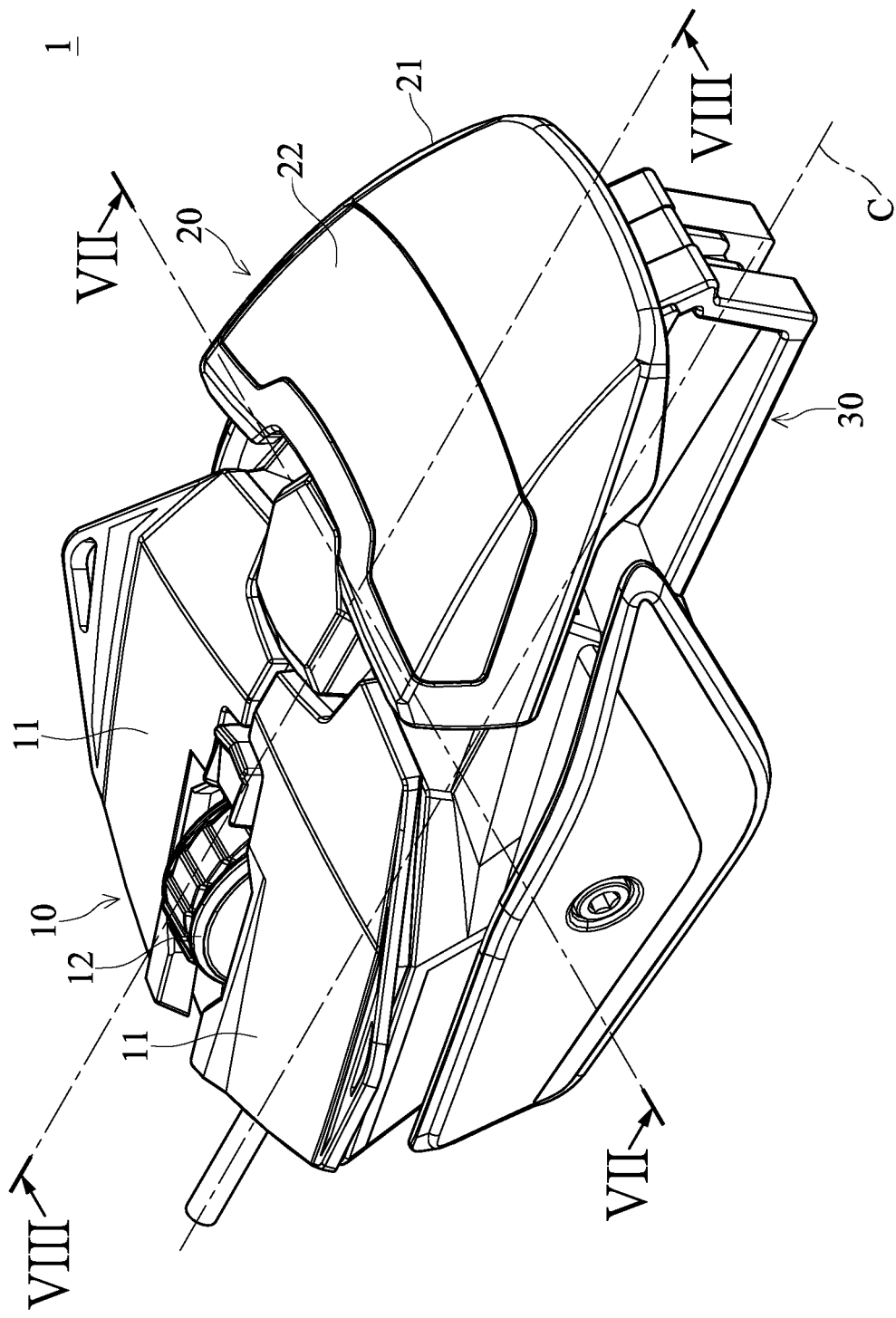
FIG. 1 is an assembled perspective view of a mouse having a movable lighting structure according to the present disclosure.
Figure 2:
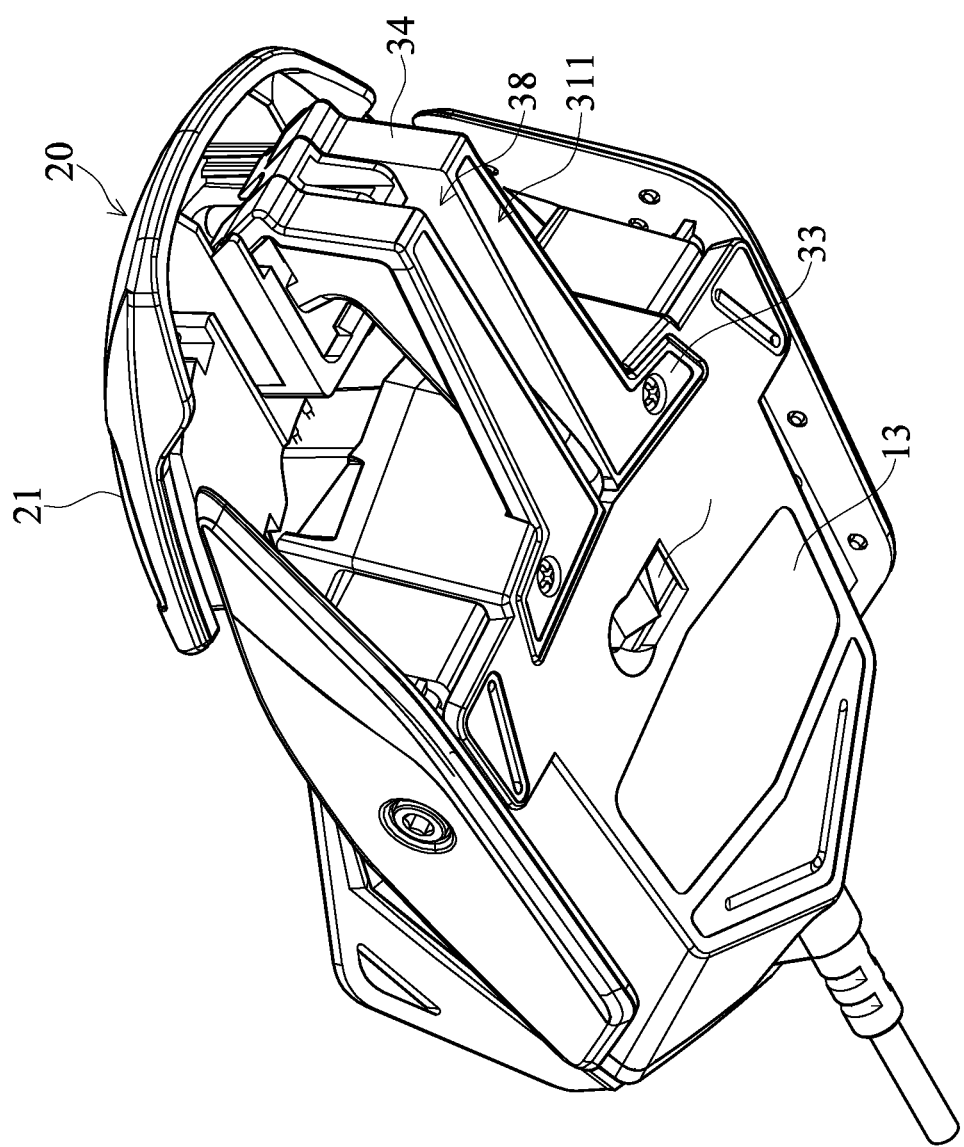
FIG. 2 is an assembled perspective view of the mouse having a movable lighting structure taken from another angle according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

As shown in FIG. 1 to FIG. 4, a mouse 1 having a movable lighting structure is provided in the present disclosure, including a mouse body 10, a movable lighting structure 20, a bracket member 30 and a wire 40. The movable lighting structure 20 is movably connected to the rear side of the mouse body 10 through the bracket member 30. A lighting module 24 is disposed in the movable lighting structure 20 and is connected to a first circuit substrate 17 in the mouse body 10 through the wire 40.

Figure 4:
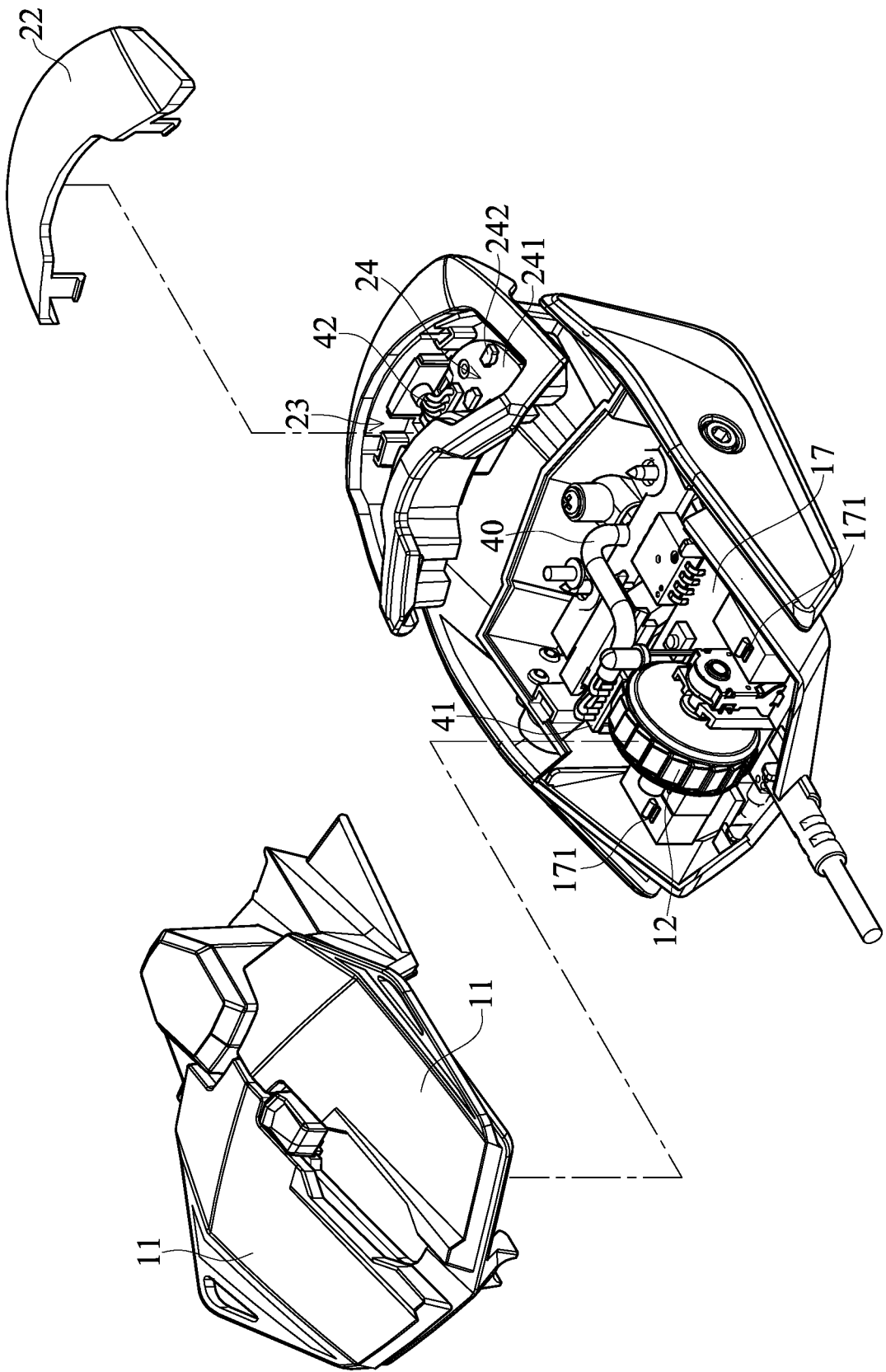
FIG. 4 is a partial exploded view of the mouse having a movable lighting structure with an upper cover removed according to the present disclosure.

The mouse body 10 has a longitudinal axis defining a longitudinal axis direction C, and has a top surface and a bottom surface opposite to each other. The top surface of the mouse body 10 is provided with a plurality of buttons 11 and at least one scroll wheel 12 for pressing or scrolling by user. The bottom surface of the mouse body 10 forms a plane. The bottom surface of the mouse body 10 is provided with a plurality of contact pads 13 for contacting a desk or a mouse pad so that the mouse 1 can move smoothly on the desk or the mouse pad. The bottom surface of the mouse body 10 is further provided with at least one optical sensor for detecting the movement of the mouse 1. As shown in FIG. 4, the first circuit substrate 17 is disposed in the mouse body 10. The scroll wheel 12 and a plurality of micro switches 171 corresponding to the buttons 11 and other circuit components are disposed on the first circuit substrate 17.

The movable lighting structure 20 is movably connected to the mouse body 10. The movable lighting structure 20 has a casing 21. An accommodating space 23 is formed in the casing 21 and has the lighting module 24 therein. The lighting module 24 has a second circuit substrate 241 and a plurality of light-emitting elements 242. The plurality of light-emitting elements 242 are light emitting diodes and soldered to the second circuit substrate 241. The second circuit substrate 241 is connected to the first circuit substrate 17 through the wire 40 such that the second circuit substrate 241 and the first circuit substrate 17 are electrically connected through the wire 40. The top surface of the casing 21 of the movable lighting structure 20 further has a light-permeable region 22 so that light generated by the lighting module 24 is transmitted to the outside of the movable lighting structure 20 via the light-permeable region 22.

It should be noted that the light-emitting elements 242 on the lighting module 24 can be light emitting diodes and the number of the light elements 242 can be two or more. The lighting module 24 is electrically connected to the first circuit substrate 17, so that the first circuit substrate 17 can supply power required by the lighting module 24 and transmit control signals through the wire 40. Accordingly, the first circuit substrate 17 can control the lighting module 24 to adjust the brightness of light or change the color of light. The first circuit substrate 17 may even control different light-emitting elements 242 to emit light with different colors, thereby generating a light mixing effect.

In this embodiment, the movable lighting structure 20 is a hand rest portion of the mouse 1. Therefore, the top surface of the casing 21 of the movable lighting structure 20 is designed to be a curved surface structure so as to conform to ergonomic standards. The movable lighting structure 20 is connected to the rear side of the mouse body 10 through the bracket member 30, and the movable lighting structure 20 and the bracket member 30 are connected through a slide rail, so that the movable lighting structure 20 can move back and forth along a predetermined movement path and a distance between the movable lighting structure 20 and the mouse body 10 changes accordingly.

In this embodiment, the bracket member 30 is connected to the rear side of the mouse body 10. The bracket member 30 extends from the rear side of the mouse body 10 toward a direction away from the mouse body 10 along the longitudinal axis direction C. A rib portion 32 is disposed in the middle of the bracket member 30. The rib portion 32 extends along the longitudinal axis direction C and protrudes upward. Two sides of the rib portion 32 below the rib portion 32 respectively extend outward to form two bottom plates 31. The bottom surfaces of the two bottom plates 31 form a contact plane 311. The contact plane 311 and the mouse body 10 are coplanar. Therefore, when the mouse 1 is placed on a desk or a mouse pad, the contact plane 311 of the bracket member 30 and the bottom surface of the mouse body 10 can concurrently contact the desk or the mouse pad.

Figure 3:
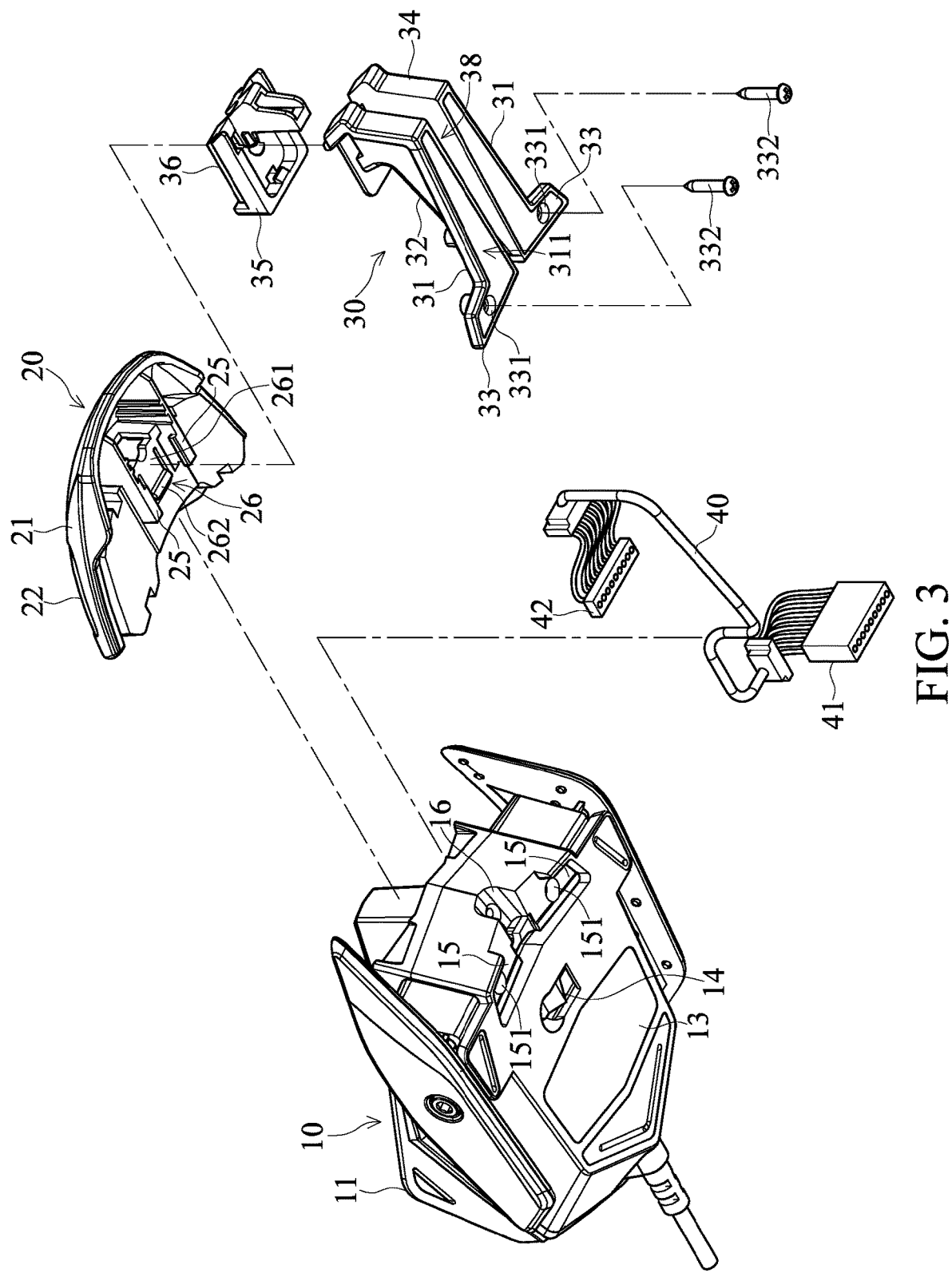
FIG. 3 is an exploded view of the mouse having a movable lighting structure according to the present disclosure.

As shown in FIG. 3, two sides of the front end of the bracket member 30 are provided with two extending plates 33 that are symmetrical to each other. Two lateral grooves 15 are disposed at positions at the bottom surface of the mouse body 10 near the rear side of the mouse body 10, and the two lateral grooves 15 have a shape corresponding to the two extending plates 33. A longitudinal groove 16 is disposed between the two lateral grooves 15 at the bottom surface of the mouse body 10, and the longitudinal groove 16 has a shape corresponding to a front end of the rib portion 32. The two extending plates 33 can be embedded in the two lateral grooves 15 and the front end of the rib portion 32 can be embedded in the longitudinal groove 16, so that the front end of the bracket member 30 can be fixedly engaged at the rear side of the mouse body 10. A screw through hole 331 is respectively disposed at the two extending plates 33, and two screw holes 151 are disposed at positions in the two lateral grooves 15 corresponding to the two screw through holes 331. When the two extending plates 33 are embedded in the two lateral grooves 15, the two extending plates 33 can be fixed into the two lateral grooves 15 by locking two screws 332 into the two screw through holes 331 and the two screw holes 151, respectively.

Figure 5:
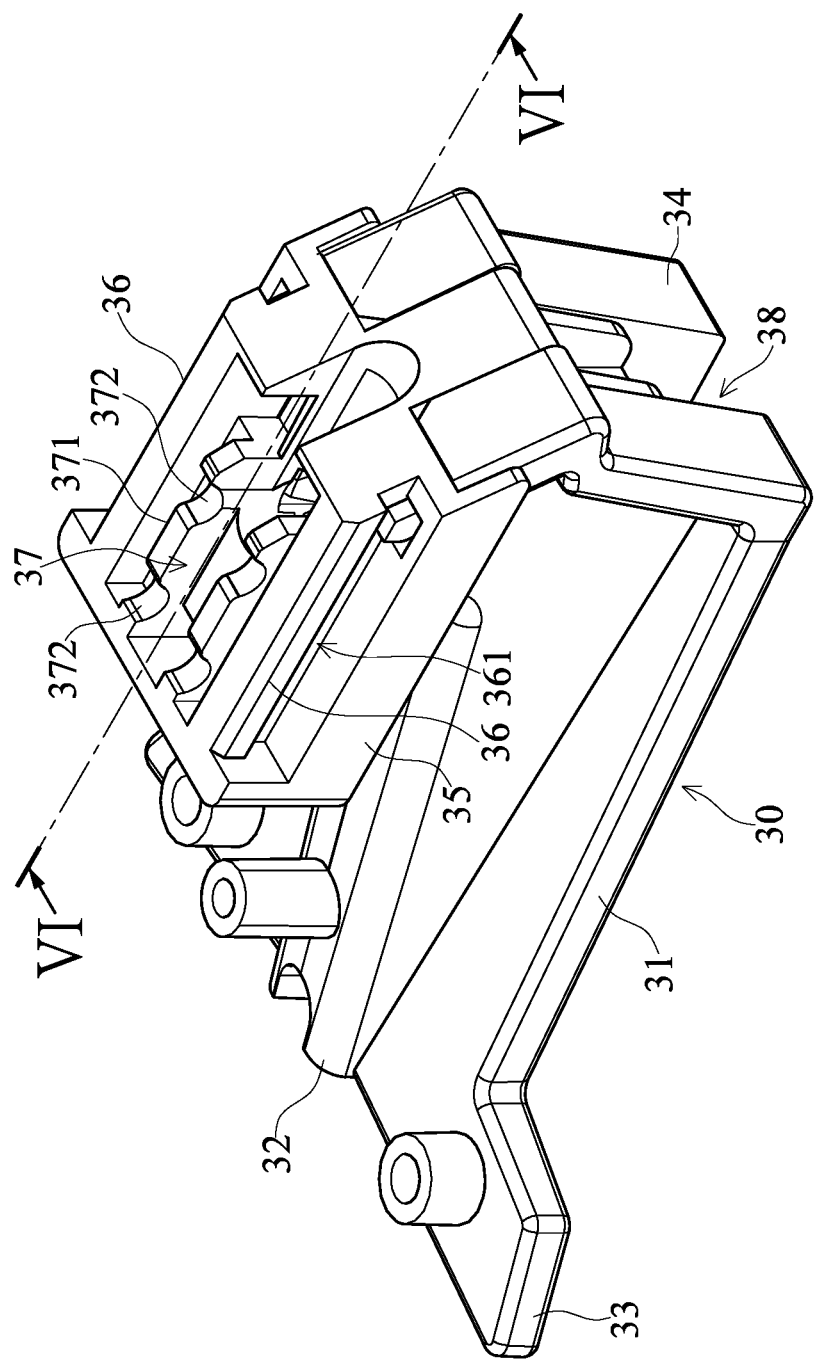
FIG. 5 is an assembled perspective view of a bracket member and a connecting seat according to the present disclosure.
Figure 6:
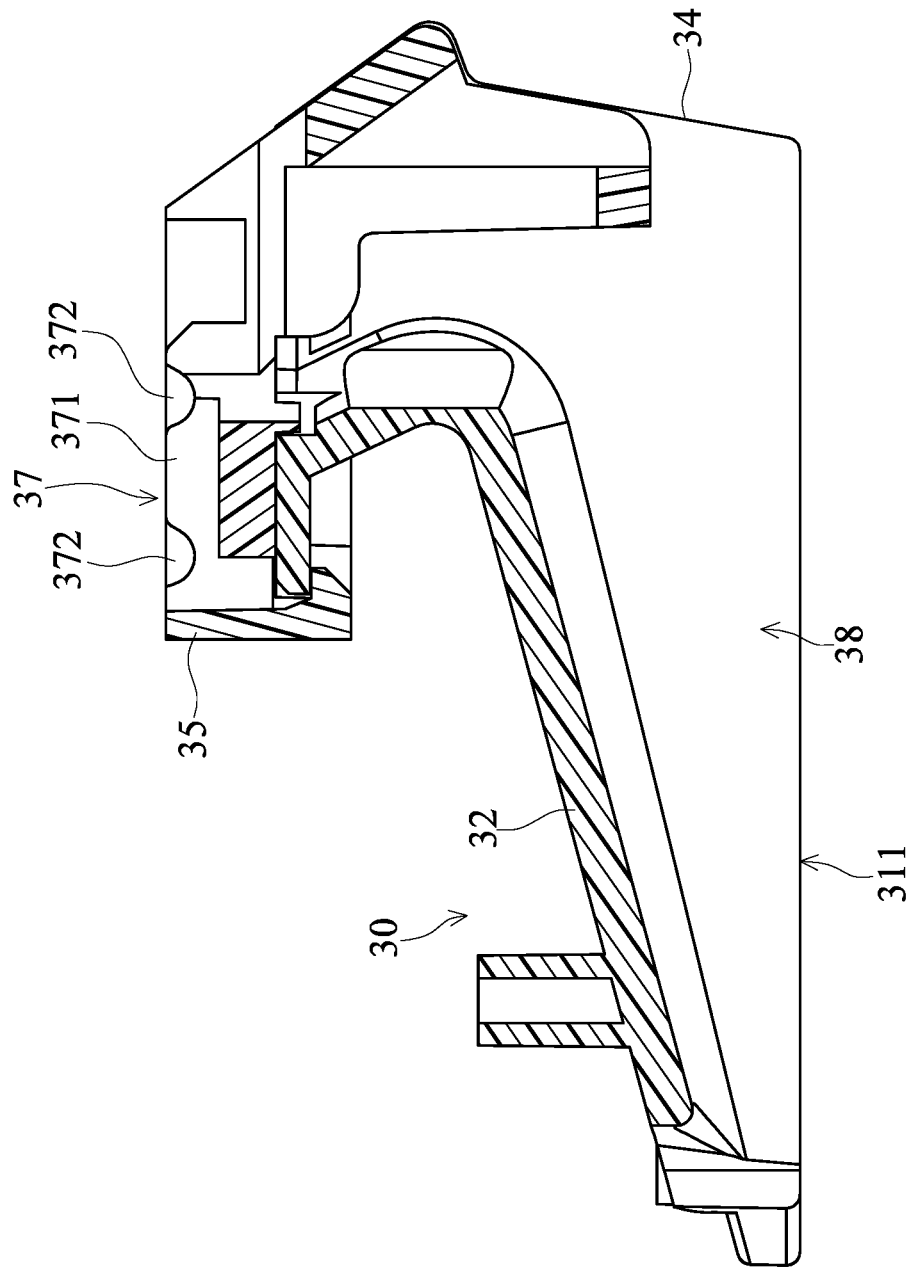
FIG. 6 is an assembled cross-sectional view of the bracket member and the connecting seat according to the present disclosure.
Figure 7:
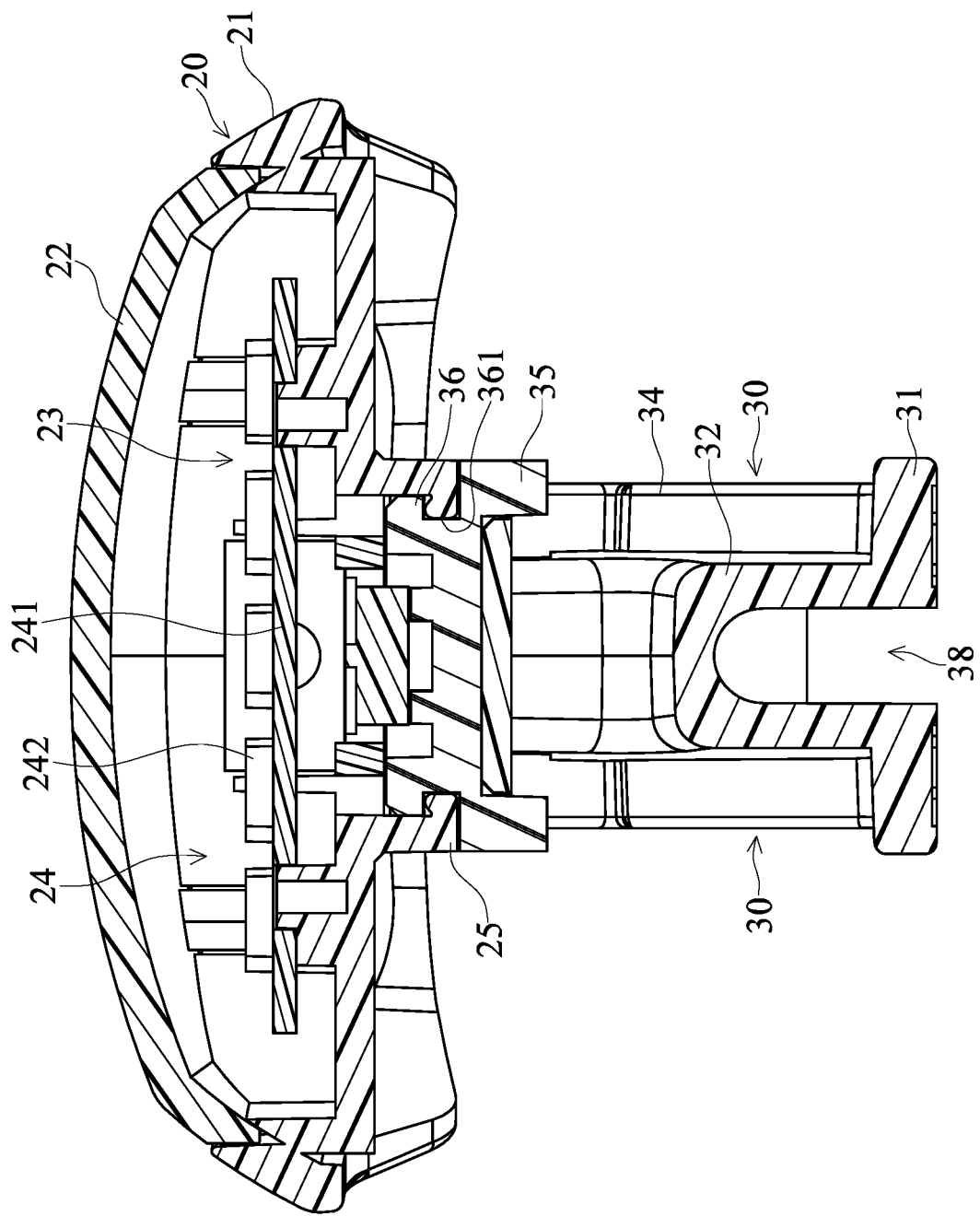
FIG. 7 is an assembled cross-sectional view of the movable lighting structure, the bracket member and the connecting seat according to the present disclosure.

As shown in FIG. 3 and FIG. 5, the rear end of the bracket member 30 forms a bent portion 34 extending upward. A connecting seat 35 is disposed at a top end of the bent portion 34 for the movable lighting structure 20 to be disposed on the top surface of the connecting seat 35. A first slide rail assembly 36 and a second slide rail assembly 25 are disposed between the movable lighting structure 20 and the connecting seat 35. The movable lighting structure 20 is disposed on the top surface of the connecting seat 35 through the first slide rail assembly 36 and the second slide rail assembly 25. In this embodiment, the two first slide rail assemblies 36 are disposed at two sides of the top surface of the connecting seat 35, and the second slide rail assembly 25 is disposed at the bottom surface of the casing 21 of the movable lighting structure 20. As shown in FIG. 7, the two first slide rail assemblies 36 each have a slide groove 361. When the movable lighting structure 20 is disposed at the top end of the bent portion 34, the two second slide rail assemblies 25 are respectively connected to the two slide grooves 361, and the two second slide rail assemblies 25 can move back and forth along the two slide grooves 361. Accordingly, a predetermined movement path can be defined by the first slide rail assembly 36 and the second slide rail assembly 25. The movable lighting structure 20 can be guided by the first and second slide rail assemblies 36, 25 to move along the predetermined movement path relative to the mouse body 10.

Figure 10:
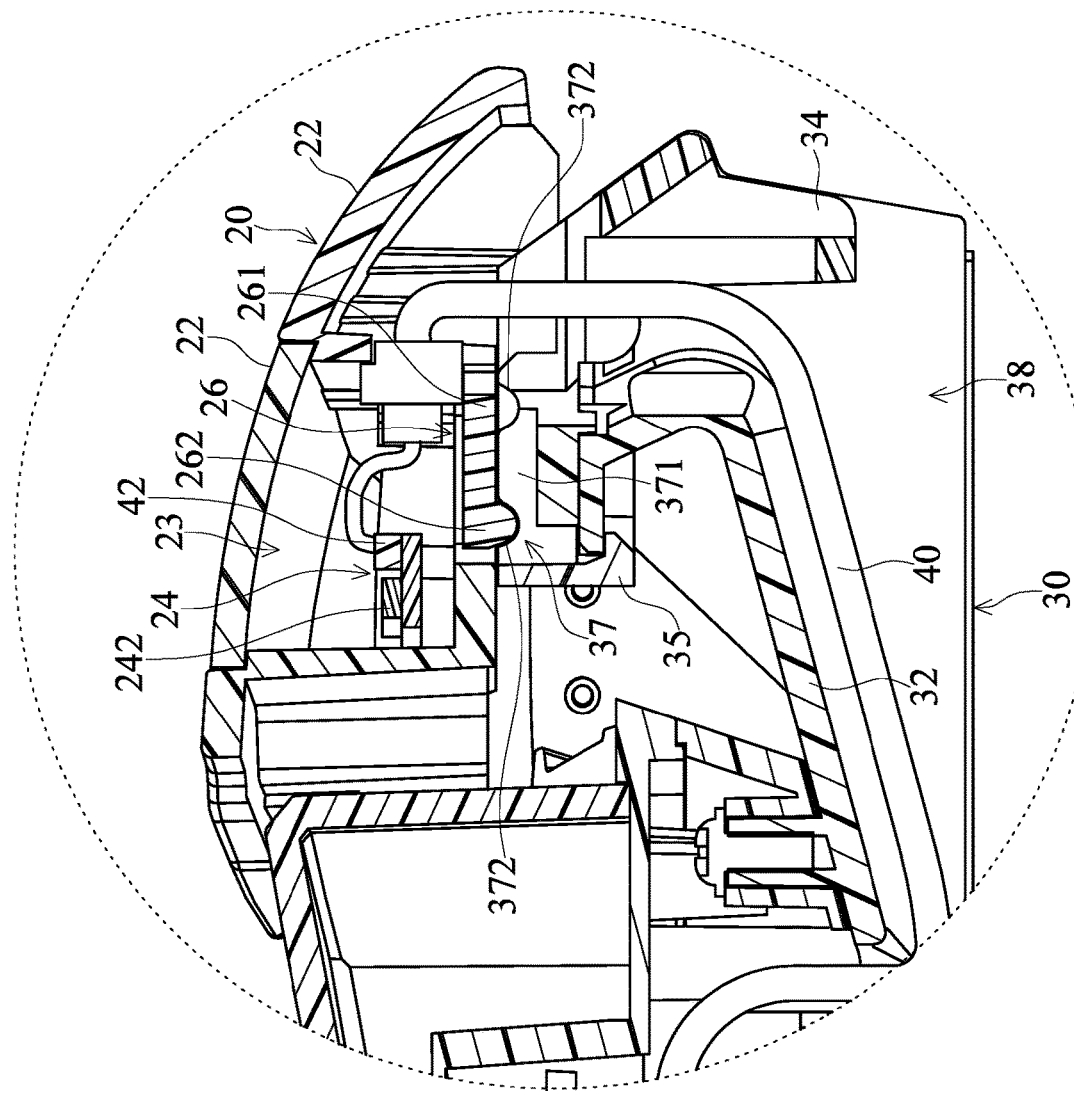
FIG. 10 is a partial enlarged view of portion X in FIG. 8.

In addition, a first positioning assembly 37 and a second positioning assembly 26 are further disposed between the connecting seat 35 and the movable lighting structure 20. The movable lighting structure 20 can be fixedly positioned at a plurality of predetermined positions on the predetermined movement path through the first positioning assembly 37 and the second positioning assembly 26. In this embodiment, the first positioning assembly 27 is disposed on the top surface of the connecting seat 35. The first positioning assembly 37 includes at least one positioning seat 371 and a plurality of positioning grooves 372. The plurality of positioning grooves 372 are arranged at the top surface of the positioning seat 371 along the predetermined movement path of the movable lighting structure 20. In this embodiment, the second positioning assembly 26 is disposed on the bottom surface of the movable lighting structure 20. The second positioning assembly 26 includes a spring contact 261 and a positioning bump 262. One end of the spring contact 261 is connected to the bottom surface of the movable lighting structure 20 to form a fixed end, and the other end of the spring contact 261 forms a movable end. The positioning bump 262 is disposed at the movable end of the spring contact 261, and the positioning bump 262 protrudes toward the second positioning assembly 26. As shown in FIG. 10, the second positioning assembly 26 is designed to obstruct the movement of the top surface of the positioning 371 by the positioning bump 262 when the movable lighting structure 20 is disposed on the connecting seat 35, such that the positioning bump 262 is pushed by elastic force of the spring contact 261 to contact the top surface of the positioning seat 371. Moreover, when the positioning bump 262 moves to any one of positions where the positioning bump 262 can be aligned with one of the plurality of positioning grooves 372, the positioning bump 262 is pushed by the elastic force of the spring contact 261 to be engaged in the corresponding positioning grooves 372.

Figure 8:
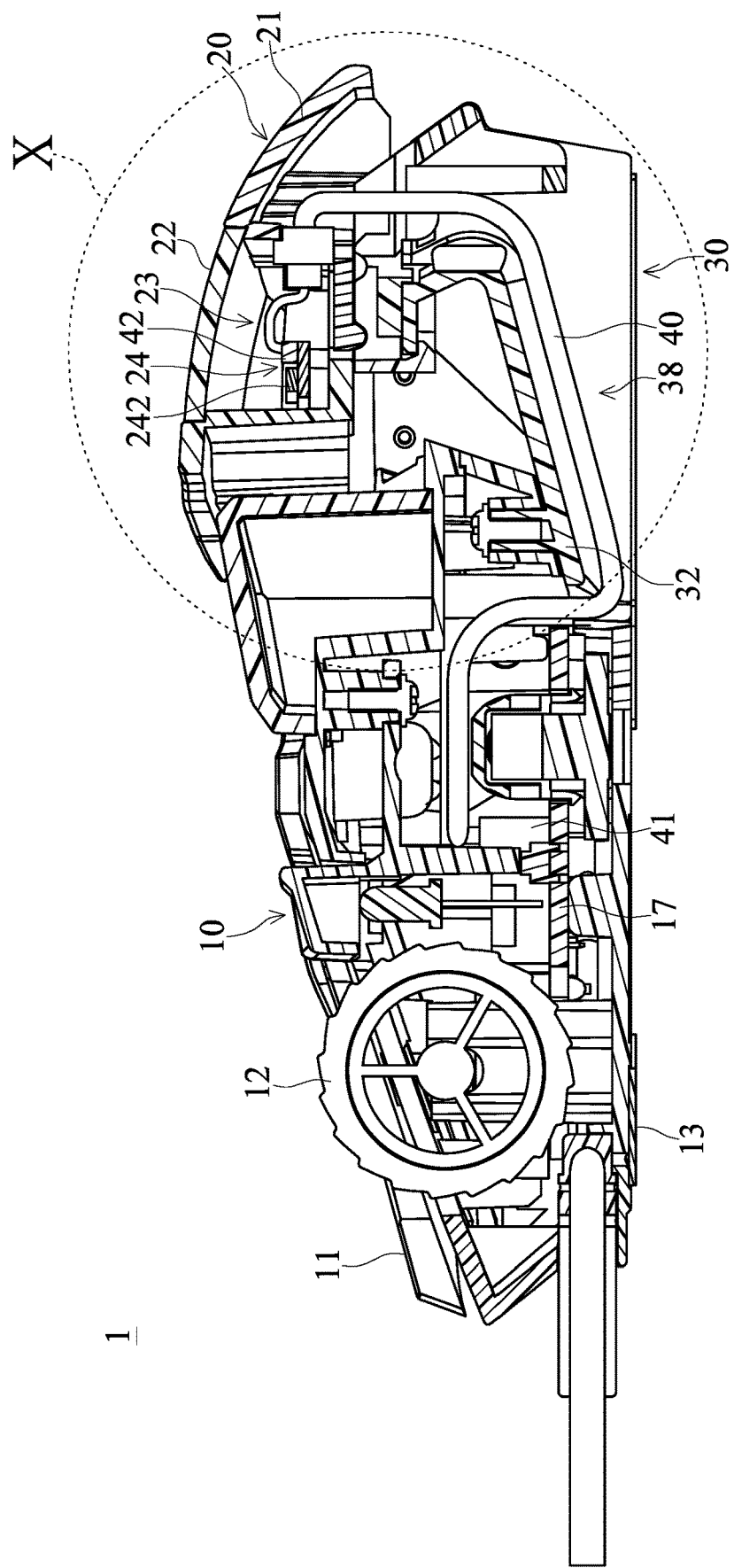
FIG. 8 and FIG. 9 are cross-sectional views of the movable lighting structure fixedly positioned at different predetermined positions according to the present disclosure.
Figure 9:
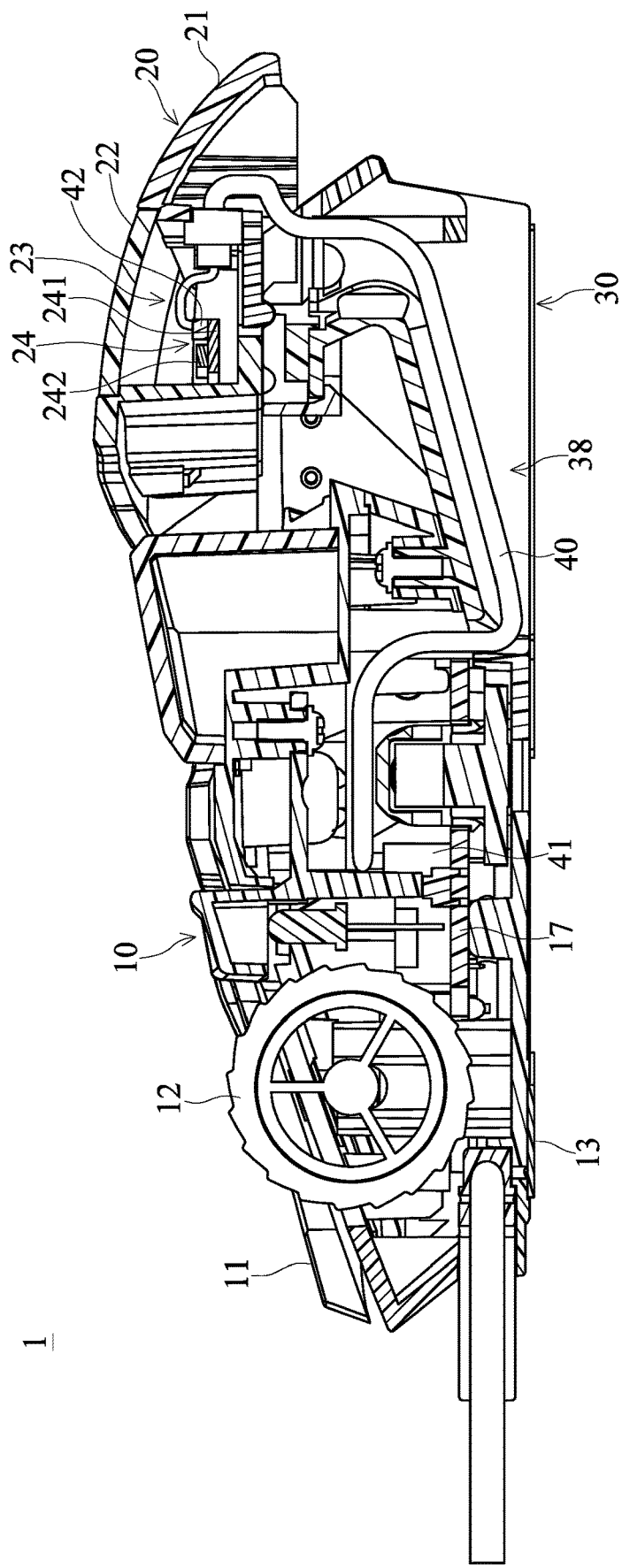

Therefore, as shown in FIG. 8 and FIG. 9, when the positioning bump 262 follows the movable lighting structure 20 to move to any one of the positions where the positioning bump 262 is aligned with one of the plurality of positioning grooves 372, the positioning bump 262 can be engaged in the corresponding positioning groove 372. That is to say, since the positioning bump 262 is selectively engaged in one of the plurality of positioning grooves 372, the movable lighting structure 20 can be fixedly positioned at different positions.

As shown in FIG. 8 and FIG. 9, the movable lighting structure 20 and the first circuit substrate of the mouse body 10 are connected through the wire 40. Since the wire 40 is flexible, when the movable lighting structure 20 moves relative to the mouse body 10, the two ends of the wire 40 can maintain a connection with the lighting module 24 and the first circuit substrate 17. In this embodiment, the wire 40 is a cable. A first connector 41 and a second connector 42 are respectively disposed at the two ends of the wire 40. The first connector 41 is connected with the first circuit substrate 17, and the second connector 42 is connected with the second circuit substrate 241. The second circuit substrate 241 and the first circuit substrate 17 are electrically connected through the wire 40 so that the lighting module 24 and the first circuit substrate 17 can transmit power and control signals through the wire 40.

As shown in FIG. 3 and FIG. 6 to FIG. 9, the bracket member 30 is provided with a wire slot 38 for accommodating the wire 40. In this embodiment, the wire slot 38 extends from the front end of the bracket member 30 to the rear end of the bracket member 30 and the top end of the bent portion 34 in a direction along the longitudinal axis of the bracket member 30. A side of the wire slot 38 forms an opening portion, and the opening portion of the wire slot 38 is exposed from the bottom surface of the bracket member 30 and the rear surface of the bent portion 34. As shown in FIG. 8 and FIG. 9, the wire 40 passes through the rear side of the mouse body 10, is engaged in the wire slot 38 from the bottom surface of the bracket member 30, passes through the wire slot 38 and the connecting seat 35 and the bottom surface of the casing 21 of the movable lighting structure 20, and enters into the accommodating space 23 to be connected with the second circuit substrate 241 of the lighting module 24.

It should be noted that the width of the wire slot 38 is designed to be larger than the diameter of the wire 40. When the wire 40 is accommodated in the wire slot 38, the wire 40 will not be tightly stuck in the wire slot 38. Accordingly, when the movable lighting structure 20 moves, the wire 40 will not be yanked and damaged.

Based on the above, the movable lighting structure 20 and the mouse body 10 can move relative to each other, and the light generated by the lighting module 24 can transmitted to the outside of the casing 21 of the movable lighting structure to create special visual effects. In addition, the movable lighting structure 20 can be a hand rest portion of the mouse. The movable lighting structure can move back and forth along a predetermined movement path through cooperation of the first and second slide rail assemblies 36 and 25, and the first and second positioning assemblies 37 and 26 and can be fixedly positioned at different predetermined positions. Therefore, users can adjust the distance between the movable lighting structure 20 and the mouse 10 according to particular requirements and user habits.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A mouse, comprising:
   a mouse body having a longitudinal axis defining a longitudinal axis direction and having a top surface and a bottom surface opposite to each other;
   a movable lighting structure movably disposed on the mouse body and having an accommodating space formed therein, wherein the movable lighting structure is a hand rest portion of the mouse;
   a lighting module disposed in the accommodating space and having at least one light-emitting element; and
   a wire connected between the mouse body and the lighting module for supplying power required by the lighting module;
   wherein a first slide rail assembly and a second slide rail assembly are disposed between the movable lighting structure and the mouse body, the first slide rail assembly and the second slide rail assembly define a predetermined movement path, and the movable lighting structure is guided by the first slide rail assembly and the second slide rail assembly to move along the predetermined movement path relative to the mouse body, and wherein the mouse further includes a bracket member and a connecting seat, wherein the bracket member is connected to the rear side of the mouse body in the longitudinal axis direction, the bracket member extends along the longitudinal axis direction from the rear side of the mouse body toward a direction away from the mouse body, the connecting seat is connected to a rear end of the bracket member, the movable lighting structure is connected to the connecting seat, and the first slide rail assembly and the second slide rail assembly are disposed between the connecting seat and the movable lighting structure, wherein the bracket member includes two bottom plates, the bottom surfaces of the two bottom plates form a contact plane that is coplanar with the mouse body.

2. The mouse according to claim 1, wherein a first positioning assembly and a second positioning assembly are disposed between the connecting seat and the movable lighting structure, and cooperate to fixedly position the movable lighting structure at a plurality of predetermined positions on the predetermined movement path.

3. The mouse according to claim 2, wherein the first positioning assembly includes a positioning seat and a plurality of positioning grooves, the plurality of positioning grooves are arranged on the positioning seat along the longitudinal axis direction, the second positioning assembly includes a spring contact and a positioning bump, the positioning bump is disposed at a movable end of the spring contact, and the positioning bump is pushed by elastic force of the spring contact so that the positioning bump contacts a side of the positioning seat facing the second assembly and is engaged in any one of the plurality of positioning grooves.

4. The mouse according to claim 1, wherein the bracket member has a wire slot, the wire slot extends from a front end of the bracket member to the rear end of the bracket member and is used for accommodating the wire, and after the wire passes through the mouse body, the wire passes through the wire slot and is connected to the lighting module.

5. The mouse according to claim 4, wherein the bottom of the bracket member forms a contact plane, the contact plane and the bottom surface of the mouse body are coplanar, the rear end of the bracket member extends upward to form a bent portion, and the connecting seat and the movable lighting structure are connected to a top end of the bent portion.

6. The mouse according to claim 5, wherein the wire slot has an opening portion exposed from the contact plane and the rear surface of the bent portion.

7. The mouse according to claim 6, wherein the movable lighting structure has a casing, the top surface of the casing forms a curved surface, and the top surface of the casing has a light-permeable region.

8. The mouse according to claim 1, wherein a first circuit substrate is disposed in the mouse body, the lighting module has a second circuit substrate, at least one of the light-emitting elements is disposed on the second circuit substrate, the wire is connected between the first circuit substrate and the second circuit substrate such that the first circuit substrate and the second circuit substrate are electrically connected through the wire.

* * * * *